United States Patent
Irvine et al.

(10) Patent No.: US 11,627,538 B2
(45) Date of Patent: Apr. 11, 2023

(54) METHODS AND SYSTEMS FOR PROVIDING TIME-SENSITIVE SERVICES RELATED TO WIRELESS DEVICES

(71) Applicant: Telefonaktiebolaget LM Ericsson (publ), Stockholm (SE)

(72) Inventors: Garry Irvine, Ottawa (CA); Alexandra Mikaelsson, Tyresö (SE); Magnus Sandgren, Staffanstorp (SE); Mårten Wahlström, Hägersten (SE); Mikael Johansson, Solna (SE); Ohan Khodaverdian, Tyresö (SE); Stefano Ruffini, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 17/257,542

(22) PCT Filed: Jul. 2, 2018

(86) PCT No.: PCT/SE2018/050714
§ 371 (c)(1),
(2) Date: Dec. 31, 2020

(87) PCT Pub. No.: WO2020/009622
PCT Pub. Date: Jan. 9, 2020

(65) Prior Publication Data
US 2021/0297965 A1    Sep. 23, 2021

(51) Int. Cl.
*H04W 56/00* (2009.01)
(52) U.S. Cl.
CPC ..... *H04W 56/001* (2013.01); *H04W 56/0045* (2013.01); *H04W 56/0055* (2013.01)
(58) Field of Classification Search
None
See application file for complete search history.

(56) References Cited

U.S. PATENT DOCUMENTS 9,237,541 B2    1/2016   Zhang et al.
9,407,357 B1 *  8/2016   Roggendorf ...... H04W 56/0015
(Continued)

FOREIGN PATENT DOCUMENTS

WO    2016036291 A1    3/2016
WO    2016099351 A1    6/2016
(Continued)

OTHER PUBLICATIONS

Author Unknown, "Technical Specification Group Radio Access Network; Evolved Universal Terrestrial Radio Access (E-UTRA); Requirements for support of radio resource management (Release 15)," Technical Specification 36.133, Version 15.2.0, 3GPP Organizational Partners, Mar. 2018, 3028 pages.
(Continued)

*Primary Examiner* — Saad Khawar
(74) *Attorney, Agent, or Firm* — Withrow & Terranova, PLLC

(57) ABSTRACT

A method performed by a system of a wireless communication network is disclosed. The method relates to provisioning of a time-sensitive service related to a wireless device. The wireless communication network comprises a plurality of antenna reference points, ARPs, of one or more radio access network nodes of the wireless communication network. The method comprises obtaining information that a first ARP and a second ARP of the plurality of ARPs are to provide the time-sensitive service to the wireless device, determining, by inter-ARP radio signalling between ARPs of one or more pairs of the plurality of ARPs, one of the one or more pairs including the first ARP and one of the one or more pairs including the second ARP, a relative timing error between the first ARP and the second ARP, and taking the determined relative timing error into consideration when providing the service to the wireless device.

19 Claims, 8 Drawing Sheets

(56) References Cited

U.S. PATENT DOCUMENTS

2016/0187458 A1* 6/2016 Shah .................. G01S 5/021
　　　　　　　　　　　　　　　　　455/456.1
2016/0302165 A1* 10/2016 Da .................... H04W 56/001

FOREIGN PATENT DOCUMENTS

WO　　　2016181198 A1　11/2016
WO　　　2019164430 A1　8/2019

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.1.0, 3GPP Organizational Partners, Mar. 2018, 495 pages.

Author Unknown, "Technical Specification Group Radio Access Network; Evolved Universal Terrestrial Radio Access (E-UTRA); Physical layer; Measurements (Release 15)," Technical Specification 36.214, Version 15.2.0, 3GPP Organizational Partners, Jun. 2018, 24 pages.

Author Unknown, "Technical Specification Group Radio Access Network; Evolved Universal Terrestrial Radio Access (E-UTRA); LTE Positioning Protocol (LPP) (Release 14)," Technical Specification 36.355, Version 14.5.0, 3GPP Organizational Partners, Mar. 2018, 171 pages.

International Search Report and Written Opinion for International Patent Application No. PCT/SE2018/050714, dated Mar. 29, 2019, 10 pages.

* cited by examiner

METHODS AND SYSTEMS FOR PROVIDING TIME-SENSITIVE SERVICES RELATED TO WIRELESS DEVICES

This application is a 35 U.S.C. § 371 national phase filing of International Application No. PCT/SE2018/050714, filed Jul. 2, 2018, the disclosure of which is incorporated herein by reference in its entirety.

TECHNICAL FIELD

The present disclosure relates generally to methods and systems of wireless communication devices for providing time-sensitive services related to wireless devices. The present disclosure further relates to computer programs and carriers corresponding to the above methods and systems.

BACKGROUND

Contemporary wireless communication networks such as Long Term Evolution (LTE), and future wireless networks based on 5G, such as New Radio (NR) are dependent on network synchronization and/or provide time-sensitive services that are dependent on network synchronization, i.e. time alignment between radio access network nodes in the network. In practice, the key time alignment requirement applies at an antenna reference point (ARP) between nodes that serve contiguous or overlapping coverage areas. However, there are Timing Errors (TE) appearing for clocks of the radio access network nodes in the network towards a common reference time base (CRT), i.e. a global clock. The difference in time between radio access network nodes in the network is called a relative Time Error (rTE). There is a synchronization requirement specified between radio access network nodes called relative Time error specification (rTE_s). An example of rTE_s is specified in 3GPP TS36.133 section 7.4 release 15.2.0 as rTE<3 µs when operating TDD LTE services with cell radius<=3 km.

Network Synchronization implementations traditionally seek to minimize the rTE at the ARPs of all radio access network nodes in a network to the CRT, by continuously adjusting each radio access network node's clock to a local reference that has traceability to the CRT. The CRT may be e.g. GPS System Time. At each radio access network node, the local reference can be provided by a global navigation satellite system (GNSS) receiver or a reference timing signal carried over the backhaul network, e.g. via a timing protocol such as Precision Time Protocol (PTP). Hence the direct network synchronization requirement between radio access nodes (rTE_s) is achieved by regulating each radio access network node clock to be within error TE_s of the CRT. In order to define requirements of maximum acceptable time error, the derived relationship between TE_s and rTE_s is as follows: |TE_s|<|rTE_s|/2. This means that to achieve an rTE below for example 3 micro seconds, the TE for each radio access network clock has to be less than 1.5 micro seconds off the CRT.

Invariably, the radio access network nodes' internal clocks have some TE to the CRT due to imperfections in its implementation. Differential TE at two nodes results in an rTE between them. In practice, the amount of TE could vary between a few tens of ns to several microseconds depending on various aspects. For example, when timing is carried via PTP over a chain of clocks, time error could accumulate along the synchronization chain due to asymmetries in the links. Amongst services requiring time-alignment, there are varying limits of rTE that can be tolerated.

Time Division Duplex (TDD) is a basic radio protocol technology. Communication using TDD is a first category of services that require a limited rTE. In a TDD network, radio access network nodes, also called base stations, may transmit and receive signals at same frequencies. To avoid interference between signals of base stations and between signals of wireless devices, also called User Equipments (UEs) communicating to different base stations operating at same frequencies in overlapping geographical areas, the base stations need to use the same TDD configurations, i.e. downlink (DL) and uplink (UL) communication at the different base stations need to be phase aligned. When the transceiver (TRX) is to switch from transmitting mode to receiving mode, there is a guard period for performing the switching. The guard period includes a margin for a rTE of neighboring base stations.

A second category of services that requires a limited rTE are sometimes referred to as coordinated services. Examples in this category are the 3GPP defined services Dual Connectivity (DC), Carrier Aggregation (CA), Multimedia Broadcast Single Frequency Network (MBSFN) and Coordinated Multipoint (CoMP) communication. The second category of services can be implemented over TDD as well as over Frequency Division Duplex (FDD).

3GPP TS 36.213 Release 15.1.0 Section 4.2.3 defines procedures related to the timing advance (TA) which regulates the UE UL frame time alignment. The UE adjusts its DL frame alignment directly to correspond with its reception of DL signals transmitted from the base station. The UE need to advance its UL frame alignment so that a UE transmitted subframe arrives aligned to the serving base station cell's corresponding subframe. Physically, this alignment is at the base station cell's antenna transmission point.

UE UL frame alignment regulation is described in FIG. 1. The UE UL frame alignment is a direct function of the propagation time from the base station, also called eNodeB (in FIG. 1 called eNB) to UE, Tprop. UE UL frame alignment is initiated with a physical random access channel (PRACH) transmission 1.1 from the UE whose time of arrival 1.2 at the eNB is measured. The time from transmission 1.1 to time of arrival 1.2 at the eNB is the propagation time, Tprop in FIG. 1. The base station determines the propagation time and calculates a TA value from the propagation time. The base station transmits 1.3 a Random Access Response (RAR) transmission 1.3 to the UE, containing the TA to be used by the UE for subsequent transmission. Due to the transmission reciprocity, the sending time for the RAR is Tprop as well. After the PRACH/RAR transmission, UE UL frame alignment is maintained when necessary with a Timing Advance Command sent by the serving eNB to the UE which contains a message indicating the relative change to the present TA required to maintain alignment.

A third category of services that depends on base stations TE is positioning methods like Observed Time Difference Of Arrival (OTDOA). The OTDOA method is based on that the phase misalignment at the UE is based on relative propagation differences, i.e. distances, between the base stations involved in the OTDOA. Also, here it is the rTE that matters since it will result in a positioning error. OTDOA is shown in FIG. 2. In this example and according to OTDOA, three base stations, BS1, BS2 and BS3 are instructed to simultaneously transmit a positioning reference signal (PRS) from their respective ARP to the UE 15. Based on difference in reception time at the UE of the transmitted positioning signals, due to differing signal propagation times, and the positions of the ARPs of the respective base stations 11, 12, 13, the position of the UE 15 is determined.

T1 signifies propagation time of the positioning signal sent by BS1, T2 signifies propagation time of the positioning signal sent by BS2 and T3 signifies propagation time of the positioning signal sent by BS3. The UE 15 determines a reference signal time difference (RSTD). A given RSTD, e.g. T2–T1 in FIG. 2, in combination with knowledge of the coordinates of the corresponding ARP's, defines a line, of hyperbolic relation, that the UE must lie on. Two or more such lines can establish the planar coordinates of the UE; while 3 or more lines can establish the 3-dimensional coordinate position.

As described, many services require exceptional precision in the time alignment of signals that are transmitted and received at ARPs. Hence, with an antenna to antenna observation of radio interface signals (RIS) that are aligned with the clock in the eNodeB (e.g. reference signals) between two eNodeBs, one can directly observe the precise rTE between those two eNodeBs. The propagation path between the two eNoeBs is assumed to be identical from the principle of reciprocity, even when the propagation path is non-Line-of-Sight (NLOS). An rTE between the two eNodeBs will be interpreted as an asymmetry in the detected propagation time between the two eNodeBs that is twice the magnitude of the rTE.

Prior art WO2016/181198 deals with such a determining of rTE between radio access network nodes using measurements of time points when sending and receiving signals between ARPs of the radio access network nodes. In the prior art, such as in WO2016/181198, the determined relative timing errors are used to synchronize the internal clocks in the radio access network nodes with each other and with a global reference clock. Such a global reference clock, such as GNSS is not always available. Further, it has been understood that there is a problem to synchronize clocks in a whole network as there will very easily be a clock mismatch somewhere. Also, if only clocks within a certain area of the network are synchronized, there is still a problem of synchronicity at the border from the certain area to a neighboring area.

Consequently, there is a need of an alternative method for determining and using knowledge of time errors between radio access network nodes of a wireless communication system.

SUMMARY

It is an object of the invention to address at least some of the problems and issues outlined above. It is possible to achieve these objects and others by using a method and an apparatus as defined in the attached independent claims.

According to one aspect, a method is provided performed by a system of a wireless communication network for provisioning of a time-sensitive service related to a wireless device. The wireless communication network comprises a plurality of ARPs of one or more radio access network nodes of the wireless communication network. The method comprises obtaining information that a first ARP and a second ARP of the plurality of ARPs are to provide the time-sensitive service to the wireless device. The method further comprises determining, by inter-ARP radio signaling between ARPs of one or more pairs of the plurality of ARPs, one of the one or more pairs including the first ARP and one of the one or more pairs including the second ARP, a relative timing error between the first ARP and the second ARP, and taking the determined relative timing error into consideration when providing the service to the wireless device.

According to another aspect, a system is provided, operable in a wireless communication network and configured for provisioning of a time-sensitive service related to a wireless device. The wireless communication network comprises a plurality of ARPs of one or more radio access network nodes of the wireless communication network. The system comprises processing circuitry and at least one memory. The memory contains instructions executable by said processing circuitry, whereby the system is operative for obtaining information that a first ARP and a second ARP of the plurality of ARPs are to provide the time-sensitive service to the wireless device, determining, by inter-ARP radio signaling between ARPs of one or more pairs of the plurality of ARPs, one of the one or more pairs including the first ARP and one of the one or more pairs including the second ARP, a relative timing error between the first ARP and the second ARP, and taking the determined relative timing error into consideration when providing the service to the wireless device.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Embodiments of the present invention seeks to solve the problem of small deviations in internal clocks of base stations, which deviations results in incorrect, or at least imprecise delivery of time-sensitive services in the network, such as OTDOA. Further, embodiments of the invention is based on the observation that it is hard to synchronize internal clocks of base stations over a whole network, which is today made towards a global clock. The inventors have further observed that to achieve more precise delivery of time-sensitive services in a communication network, it is not necessary to synchronize the internal clocks of base stations to a global clock, it is enough if the base stations that are involved in delivering a certain time-sensitive service to a wireless device are synchronized with each other. Based on these observation, a solution is provided wherein a time-sensitive service related to a wireless device is provided in the network by obtaining information of which ARPs from a plurality of ARPs in the network that are involved in delivering a time sensitive service for a wireless device. Then a relative timing error, also called clock difference, is determined between the ARPs that are to provide the service. The relative timing error is determined by sending of radio signals between at least the ARPs that are to provide the service. The determined relative timing error between the ARPs involved in delivering the service is then taken into account for when delivering the service to the wireless device. A way of taking the determined relative timing error into account is by adapting the time points for transmission of signals to the wireless device to the determined timing error. 3GPP defines the ARP as the eNB's reference point to align signals coupled over the air, i.e. the air interface. In practice, an eNB consists of separate subsystems, one of which is the network synchronization clock that is traceable to a common clock, e.g. GPS system time. Signals transmitted from and received at the eNB are aligned to this clock with the intent to establish alignment at the ARP. Offsets between the clock and signals at the ARP represent implementation imperfections, so the ARP provides a more proper reference point to use instead of e.g. an eNB processing system.

Figure 1:
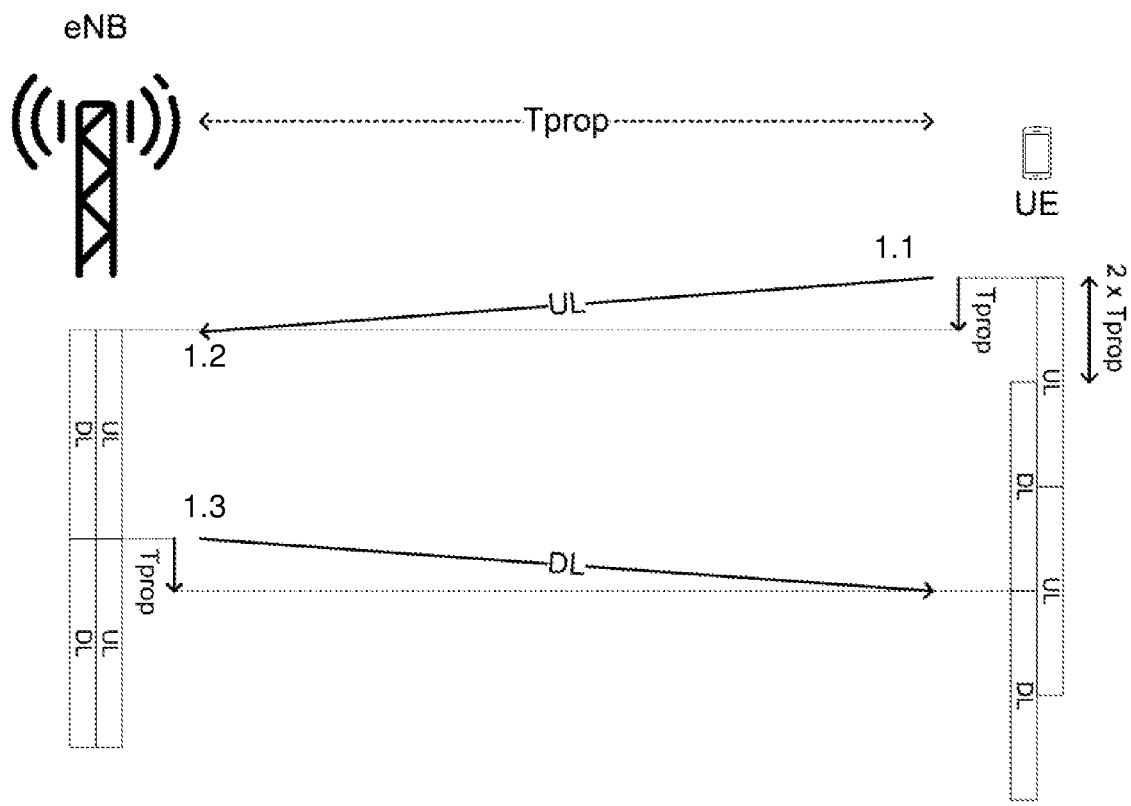
FIG. 1 is a signaling diagram of a communication scenario between a UE and a base station illustrating propagation times for wireless communication signals.
Figure 2:
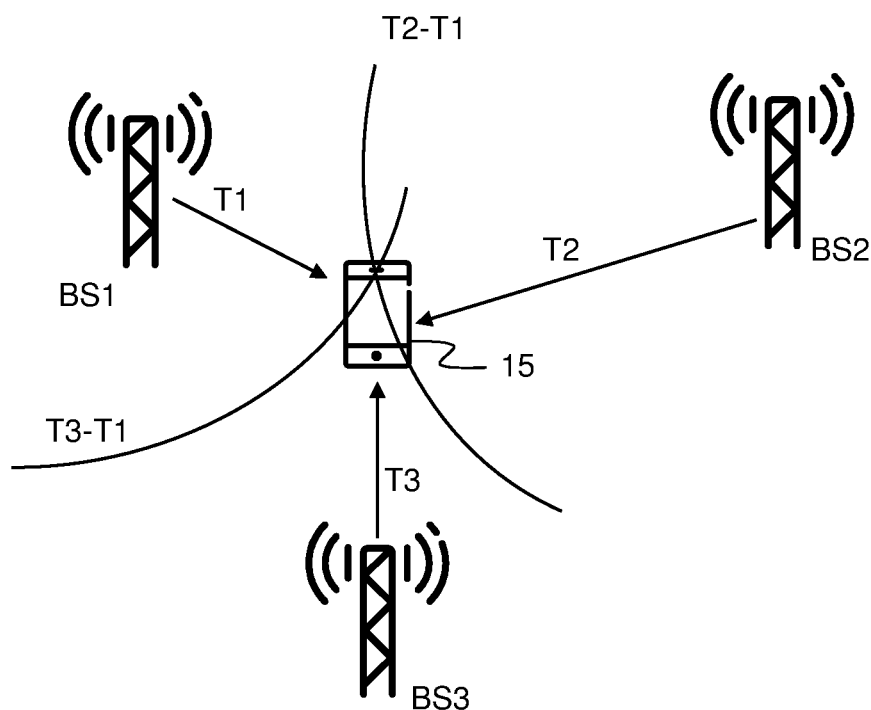
FIG. 2 is a schematic block diagram illustrating a UE positioning method based on relative propagation time differences for wireless signals from base stations.
Figure 3:
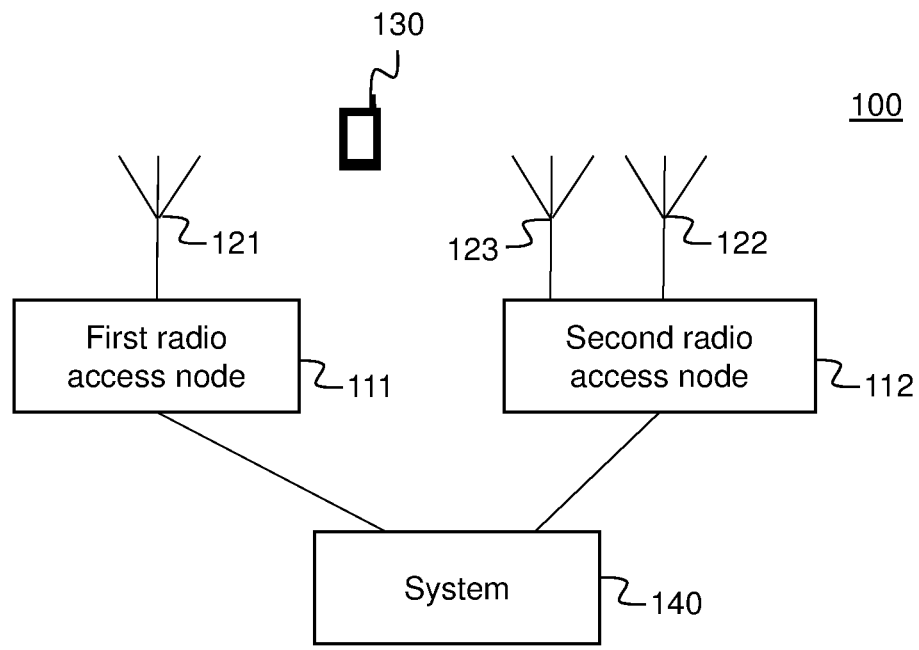
FIG. 3 is a block diagram of a wireless communication network in which the present invention may be used.

FIG. 3 shows a wireless communication network 100 comprising a first radio access network node 111 having a first ARP 121. The first radio access network node 111 is adapted for wireless communication with a wireless device 130 via the first ARP 121. The wireless communication network 100 further comprises a second radio access network node 112 having a second ARP 122 and a third ARP 123. The second radio access network node 112 is adapted for wireless communication with the wireless device 130 via the second ARP 122 and/or the third ARP 123. The first and second radio access network nodes 111, 112 are connected to a system 140 for performing embodiments of the present invention. The system 140 may be another radio access network node or a core network node, or the system may comprise functionality for performing embodiments of the method, spread out over a plurality of physical network nodes. The ARP is the physical point in an antenna at which radiation spreads, e.g. spherically. Typical base-station antennas with simple patterns and linear polarizations have a well-defined predictable ARP. In practice, the ARP can be approximated by the physical RF connector port without impact to dependent applications.

Figure 4:
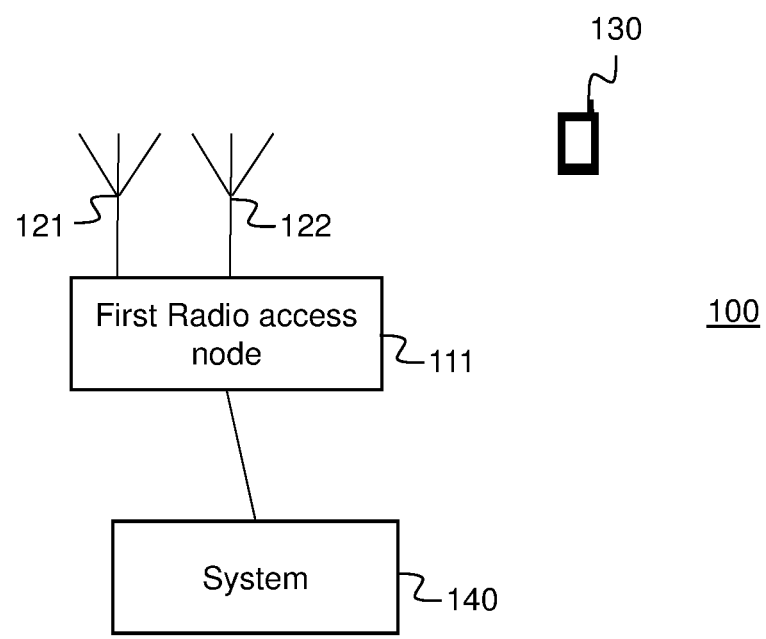
FIG. 4 is a block diagram of another wireless communication network in which the present invention may be used.

FIG. 4 shows an alternative to the wireless communication network 100 of FIG. 3. In the alternative network, the first ARP 121 and the second ARP 122 are arranged to the same radio access network node, here the first radio access network node 111.

The wireless communication network 100 may be any kind of wireless communication network that can provide radio access to wireless devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The first and second radio access network nodes 111, 112 may each be any kind of network node that provides wireless access to the wireless device 130 alone or in combination with another network node. Examples of radio access network nodes 111, 112 are a base station (BS), a radio BS, a base transceiver station, a BS controller, a network controller, a Node B (NB), an evolved Node B (eNode B or eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless device 130 may be any type of device capable of wirelessly communicating with a radio access network node 111, 112 using radio signals. For example, the wireless device 130 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc. The wireless device may also be called "wireless communication device".

Figure 5:
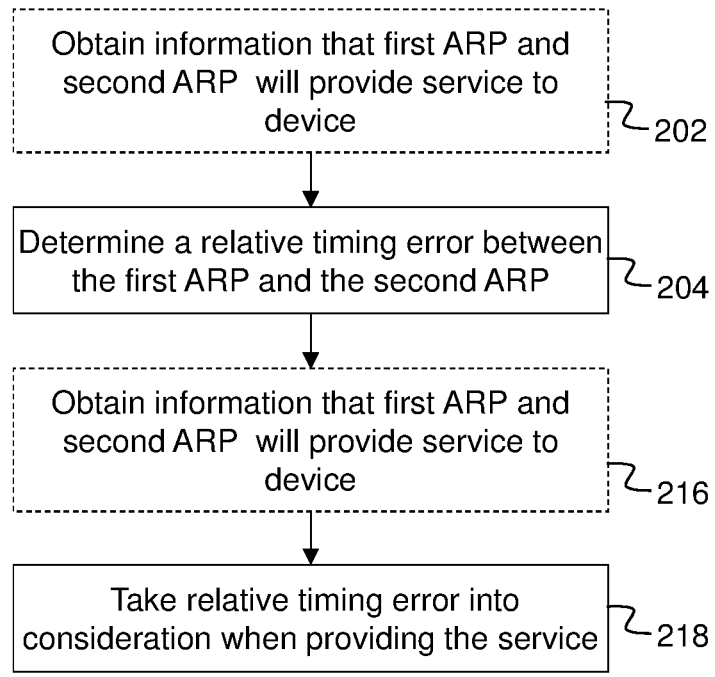
FIG. 5 is a flow chart illustrating a method perform by a system, according to possible embodiments.

FIG. 5, in conjunction with FIG. 3 or 4, describes a method performed by a system 140 of a wireless communication network 100 for provisioning of a time-sensitive service related to a wireless device 130. The wireless communication network 100 comprises a plurality of ARPs of one or more radio access network nodes 111, 112 of the wireless communication network. The method comprises obtaining 202, 216 information that a first ARP 121 and a second ARP 122 of the plurality of ARPs are to provide the time-sensitive service to the wireless device 130. The method further comprises determining 204, by inter-ARP radio signalling between ARPs of one or more pairs of the plurality of ARPs, one of the one or more pairs including the first ARP 121 and one of the one or more pairs including the second ARP 122, a relative timing error between the first ARP 121 and the second ARP 122, and taking 218 the determined relative timing error into consideration when providing the service to the wireless device 130.

The term "Inter-ARP radio signaling" signifies radio signals that are sent between ARPs so that one ARP sends a radio signal and another ARP receives the same radio signal. A "relative timing error" between a first ARP 121 and a second ARP 122 signifies the timing difference, i.e. clock difference, between the first ARP 121 and the second ARP 122. The relative timing error is determined by sending signals back and forth between two ARPs of a pair of ARPs.

There may be signaling between one or more pairs of ARPs involved when determining the relative timing error between the first ARP and the second ARP. The relative timing error is determined as a mismatch between a first time that it takes for sending a radio signal one way between the ARPs of a pair and a second time that it takes for sending a radio signal the opposite way between the ARPs of the same pair.

A first, and easiest, alternative to determine the relative timing error between the first ARP 121 and the second ARP 122 is to have only one ARP pair comprising the first ARP 121 and the second ARP 122. Then a first radio signal is sent from the first ARP 121 to the second ARP 122, and the sending time point is detected at the first ARP 121 and the receiving time point is detected at the second ARP 122. Then a second radio signal is sent from the second ARP 122 to the first ARP 121 and the sending time point and the receiving time point for the second radio signal is detected at the respective ARP. Then the first time between the sending time point and the receiving time point of the first signal is determined and the second time between the sending time point and the receiving time point of the second signal is determined. The relative timing error between the first ARP 121 and the second ARP 122 is then determined as the difference between the first time and the second time. This first alternative is described in an embodiment below and also in claim 2.

A second alternative for determining the relative timing error between the first ARP 121 and the second ARP 122 has its main usage when there is not possible for the first ARP 121 and the second ARP 122 to reach each other by direct radio signals. In the second alternative, the relative timing error between the first ARP 121 and the second ARP 122 is instead determined via a third ARP that both the first and the second ARP 122 can reach. In other words, the relative timing error between the first ARP 121 and the third ARP is determined, and the relative timing error between the second ARP 122 and the third ARP is determined. Inter-ARP radio signalling is then performed for two ARP pairs, one pair consisting of the first ARP 121 and the third ARP and one pair consisting of the second ARP 122 and the third ARP. The relative timing error between the first ARP 121 and the second ARP 122 is then determined based on the relative timing error between the first ARP 121 and the third ARP and on the relative timing error between the second ARP 122 and the third ARP. The relative timing errors between the first ARP 121 and the third ARP, and between the second ARP 122 and the third ARP, can be determined in a similar way as when determining the relative timing error directly between the first and the second ARP, as in the first alternative. In case the first and second ARP cannot reach each other via only one other ARP, there may be longer paths of direct radio connections, also called hops, in order for the first ARP 121 to reach the second ARP 122 via radio signals, e.g. via a third and a fourth ARP. In that case, relative timing errors are determined for each ARP to ARP hop in a radio connection path determined between the first ARP 121 and the second ARP 122, and the relative timing error between the first ARP 121 and the second ARP 122 is determined based on the relative timing errors of each hop in the path. Each hop comprises one pair of ARPs in an inter-ARP radio signalling.

According to an embodiment, one of the one or more pairs has to include the first ARP 121 and one of the one or more pairs has to include the second ARP 122. In the first alternative there is only one pair, which contains the first and the second ARP. In the second alternative there are two pairs, the first pair including the first ARP 121 and the second pair including the second ARP 122. In case there are more pairs, i.e. hops involved, one of the pairs still has to include the first ARP 121 and one of the pairs has to include the second ARP 122.

The time-sensitive service may be a time-critical service, i.e. a service where accuracy of time points of the service is of central importance to the service performance, such as services requiring time-alignment. An example of such a service is to determine the geographical position of a device based on timing of signals sent from a plurality of antenna reference points, using triangulation, such as OTDOA.

The system of the wireless communication network that performs the method may be a wireless communication network node, such as a core network node, e.g. a Mobile Positioning System, MPS, node or an access network node. Alternatively, the system of the wireless communication network that performs the method may be a group of network nodes, wherein functionality for performing the method are spread out over different physical, or virtual, nodes of the network. In other words, the system for provisioning of a time-sensitive service related to a wireless device 130 may be a cloud-solution, i.e. the system may be deployed as cloud computing resources that may be distributed in the network.

The step of obtaining 202, 216 information that the first ARP 121 and the second ARP 122 are to provide the service to the wireless device 130 may take part after the relative timing error of the first ARP 121 and the second ARP 122 has been determined. This is marked with the box 216 in FIG. 5. In such a case, relative timing errors between a lot of ARPs (including the relative timing error of the first ARP 121 and the second ARP 122) may then be decided in advance and then only the timing errors are selected that are of interest for this method. However, it may also be the case that the ARPs to be used for providing the service to the wireless device 130 are determined before the determining of the actual relative timing errors. This alternative is marked with box 202 in FIG. 5. The fact that a first and a second ARP is providing the service does not mean that a third ARP and possibly a fourth ARP are excluded from providing the service, only that at least the first ARP 121 and the second ARP 122 provides the service. In case a third ARP and possibly a fourth ARP are involved in providing the service to the wireless device 130, a relative timing error maybe determined for all three or possibly four ARPs.

The phrase "taking the determined relative timing error into consideration . . . " could signify different alternatives such as "determining whether the relative timing error is small enough to provide the service", "determining a precision with which the service may be provided", or "adapting the sending time of signals regarding the service from or to the first ARP 121 and the second ARP 122 so that the determined relative timing error is compensated for". Such embodiment are further elaborated on below.

In the present invention, instead of, or in addition to, synchronizing the radio access network nodes' clocks to a global reference clock, as in prior art WO2016/181198, the determined relative timing errors between the ARPs involved in delivering a time-sensitive service to a particular wireless device are used for adapting communications regarding that particular service of that particular wireless device. Consequently, in the case when two radio access network nodes are to deliver a time-sensitive service to a wireless device, only the relative timing error between those two radio access network nodes are taken into consideration when delivering the service. Hereby, a good time alignment is achieved for delivering the service and there is no risk falling into the problem of synchronizing internal clocks over a wide system.

Figure 6:
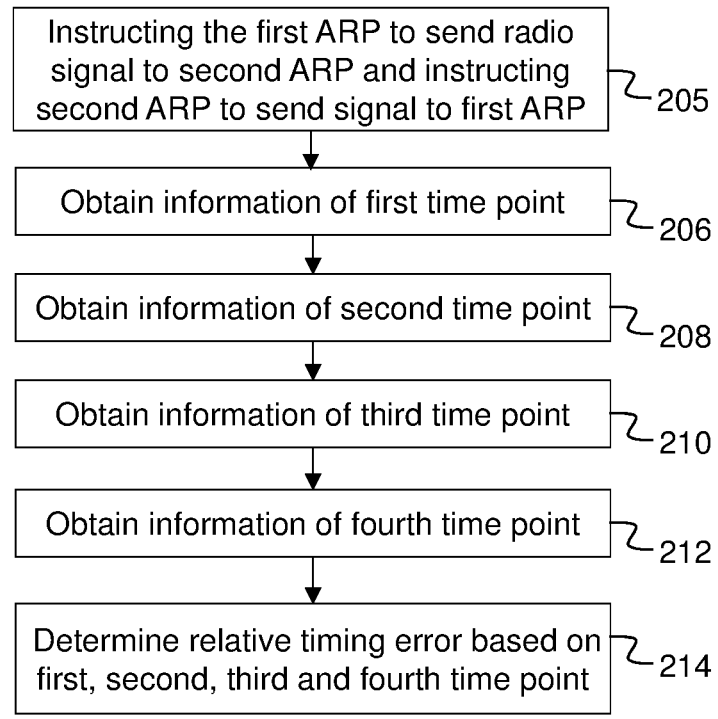
FIG. 6 is a flow chart illustrating another method perform by a system, according to possible embodiments.

FIG. 6 describes an embodiment of the invention discussed above as the first alternative for determining the relative timing error. In the first alternative, the determining 204 of a relative timing error between the first ARP 121 and the second ARP 122 using inter-ARP radio signaling comprises instructing 205 the radio access network node of the first ARP 121 to send a first radio signal to the second ARP 122 and instructing the radio access network node of the second ARP 122 to send a second radio signal to the first ARP 121 in response to receiving the first radio signal. The determining 204 further comprises obtaining 206 information of a first time point indicative of transmission of the first radio signal from the first ARP 121, obtaining 208 information of a second time point indicative of reception of the first radio signal at the second ARP 122, obtaining 210 information of a third time point indicative of transmission of the second radio signal from the second ARP 122, obtaining 212 information of a fourth time point indicative of reception of the second radio signal at the first ARP 121, and determining 214 the relative timing error between the first ARP 121 and the second ARP 122 based on the first, second, third and fourth time points.

The first and the second radio signals may be reference signals, such as existing reference signals, e.g. SRS or PRS. The first and third time point indicative of transmission of signals are known as such for reference signals as in LTE, reference signal transmissions such as PRS transmissions are configured at each radio access network node (e.g. eNB) to occur at periodic, deterministic time points. The PRS configuration must be conveyed/known at the eNB or eNBs controlling a pair of ARP's for which a rTE observation is being made. The second and fourth time point indicative of reception of the radio signals can be measured.

This first alternative provides a well-functioning way of determining a relative timing-error between two ARPs delivering a time-sensitive service to a wireless device 130, when the first ARP 121 and the second ARP 122 can reach each other with radio signals directly.

According to an embodiment, only relative timing errors related to ARPs of the plurality of ARPs that are involved in the determining 204 of a relative timing error between the first ARP 121 and the second ARP 122 are taken into consideration when providing the service to the wireless device 130. For example, when a fourth ARP is not involved in the determining of the relative timing error between the first ARP 121 and the second ARP 122, then the relative timing errors related to the fourth ARP are not used when providing the service to the device. In other words, only the relative time errors between the ARPs involved in the service are typically taken into consideration. However, if other ARPs are involved in determining the relative timing errors of the ARPs involved in the service, then these relative timing errors of other ARPs are implicitly also taken into consideration insofar as they are used for calculating the relative timing errors between the ARPS involved in the service For different instances of service provision, there may thus be different sets of ARPs and hence different time adjustments used.

In a further embodiment, timing errors relative to ARPs not involved in the service may be taken into account not only insofar as they may be used for calculating the relative timing errors between the ARPS involved in the service, but also for e.g. reducing interference from the service to the non-involved, e.g. neighbor, ARPs and vice versa. The decision of which timing errors to take into consideration will still be based on which ARPs are involved in the service, but the decision may be to take also timing errors from other ARPs into account According to an embodiment, the determined relative timing error is taken 218 into consideration by adjusting a time point for transmission of data of the time sensitive-service from the first ARP 121 to the wireless device 130 to a time point for transmission of data of the time-sensitive service from the second ARP 122 to the wireless device 130 based on the determined relative timing error in order to synchronize the transmission of data of the time-sensitive service from the first ARP 121 to the transmission of data of the time-sensitive service from the second ARP 122. Hereby, the service can be delivered more exactly in time compared to not taking the relative timing error into consideration. For example, an OTDOA service for determining position of a wireless device 130 would determine the position of the wireless device 130 more exact.

According to another embodiment, the determined relative timing error is taken 218 into consideration by determining whether the relative timing error is below a defined threshold for providing the time-sensitive service. By determining to provide the service when the relative timing error is below a defined threshold, for example below 3 micro seconds, but the allowed drift towards a global clock is +/−1.5 micro seconds, this approach would also allow a case when a first ARP 121 has a global drift of +2.0 and the second ARP 122 has a global drift of −0.9 towards the global clock. As the relative timing error is what matters when delivering the service, this approach would make more ARPs come into consideration for delivering the time-sensitive service than the global clock approach of WO 2016/181198. Different time-sensitive services may have different time alignment requirements so the defined threshold may differ for different services.

According to another embodiment, the determined relative timing error comprises a quality estimate estimating the accuracy of the relative timing error. The quality estimate may be based on accuracy of time stamps of the inter-ARP signals sent between the ARPs of the pairs, on signal quality of the inter-ARP signals, such as Signal to Noise Ratio, SNR, and/or on bandwidth of the inter-ARP signals. The quality estimate would then define the accuracy of the relative timing error, which could be useful when determining how to take the relative timing error into consideration. If a timing error could be determined in more than one way, by using different sets of ARPs, then the differences between errors so determined for a same set of ARPs could provide an indication of accuracy.

According to another embodiment, the determined relative timing error comprises information of historical drift of the relative timing error and information of when the relative timing error was determined. Information of the historical drift in relation to when the relative timing error was determined would then indicate how reliable the determined relative timing error is.

According to another embodiment, the time-sensitive service is a Time-of-Arrival positioning service such as Observed Time Difference of Arrival, OTDOA. The method further comprises obtaining an observed time difference of arrival at the wireless device 130, of a first positioning signal at the wireless device from the first ARP 121 and of a second positioning signal at the wireless device from the second ARP 122, Further, the taking 218 of the determined relative timing error into consideration when providing the service to the wireless device comprises adapting the obtained observed time difference of arrival with the determined relative timing error.

According to another embodiment, the time-sensitive service is a Coordinated Multipoint service (CoMP), and the first ARP 121 is a serving cell and the second ARP 122 is a candidate cell. The method further comprises obtaining a timing advance (TA) value for the wireless device 130, determining when the wireless device 130 is to transmit a CoMP signal to the first ARP 121 and the second ARP 122, the TA value being obtained so that the CoMP signal is received within a time window of the first ARP 121 and within a time window of the second ARP 122. Further, the taking 218 of the determined relative timing error into consideration when providing the service to the wireless device 130 comprises adapting the obtained TA value with the determined relative timing error. Then the method further comprises initiating transmission of the adapted TA value to the wireless device 130. The TA value used by the wireless device 130 needs to be determined so that a CoMP signal sent from the wireless device is received at the first ARP 121 and the second ARP 122 within their respective time windows set for receiving signals from the wireless device 130, taken their different distances from the wireless device into consideration. This embodiment also takes into consideration the relative timing error between the first ARP 121 and the second ARP 122, and adapts the TA value to the relative timing error so that the CoMP signal is received within the timing windows for the first ARP 121 and the second ARP 122.

According to another embodiment, the method further comprises obtaining information that the first ARP 121 and a third ARP 123 of the plurality of ARPs are to provide the time-sensitive service to a second wireless device. the method further comprises determining, by inter-ARP radio signalling between ARPs of one or more pairs of the plurality of ARPs, one of the one or more pairs including the first ARP 121 and one of the one or more pairs including the third ARP 123, a second relative timing error between the first ARP 121 and the third ARP, and taking the determined second relative timing error into consideration when providing the service to the second wireless device.

This embodiment describes that different timing adjustments may be used for one and the same ARP (here the first ARP) depending on when a service is delivered to a first wireless device and when a service is delivered to a second wireless device. In other words, different time adjustments may be used quasi-simultaneously when time-sensitive services involving different sets of ARPs are executed in an interleaved fashion in overlapping time intervals for different wireless devices, such that the timing adjustment used for one ARP changes back and forth during a time overlap of delivering the service to the first wireless device and delivering a service to the second wireless device, as transmission/reception is made alternately for the different services. An example would be e.g. two UEs with ongoing dual connectivity sessions.

In the following, different embodiments are described for realizing the present invention. According to an embodiment, the solution is based on a concept called virtual synchronization of base stations that is realized by means of time error measurements performed between neighbor base stations, using for example a synchronization reference signal carried over a radio frame sent between neighbor base stations. Network synchronization on the other hand, is a prior art method of synchronization of base station clocks to a common global clock in order to fulfill the 3GPP requirement of rTE between any two cells with overlapping coverage areas. Virtual Synchronization may be a transparent overlay on the Network Synchronization, i.e. it does not have to affect the classical operation of Network Synchronization. Virtual Synchronization may be a substitute for Network Synchronization or it may be used in addition to Network Synchronization. Virtual Synchronization may observe inter-eNB relative time error (rTE) via the exchange of radio interface signals (RIS) between the eNBs. Additional and ongoing rTE observations can be made based on factors including: TE tolerance of the service, observed TE drift rate, quality of rTE observation. rTE observations can be managed by a central server which maintains a matrix of rTE elements between any eNB to any other eNB in the network. Alternatively, rTE data can be managed in a decentralized fashion and associated with, for example, Automatic Neighbor Relations (ANR) procedures. The rTE observations can contain a quality estimate, based for example on eNB time stamp accuracies, SNR and reference signal bandwidth—Time allocation. The rTE observations can contain a time of observation information together with historical drift to give an indication of how reliable data still is. Missing elements that are not available from a direct RIS observation can be derived as an algebraic combination of rTE observed in intermediate elements. As a practical matter, rTE in elements for eNB's that are physically separated more than some threshold need not be populated. A time-sensitive service that is dependent on high performance TE from multiple eNB's in the same region can look up rTE for the specific elements corresponding the eNB's involved and "fine-tune" the baseband-streams to compensate for the rTE. Hence, rather than minimize the TE of all eNB's to a global common clock, the service-entity makes an a posteriori timing adjustment only to transmission and/or reception signals that are jointly used in the subset of eNBs provisioning a particular service in order to minimize, e.g. with a Minimum Mean Square Error (MMSE) method, their resultant rTE amongst the subset.

A RIS observation offers a direct eNB to eNB observation at the ARP of the rTE. In principle, this involves a minimum set of equipment, i.e. TE estimates by alternative means would, by definition, include a superset of elements e.g. network equipment, GNSS receivers etc. incremental to the eNB. Hence a straightforward case can be made that a RIS observation ought to result in a superior rTE accuracy between the eNBs involved. Because Virtual Synchronization via RIS is transparent, it does not necessitate alteration to the classical provision of network synchronization. Hence it can be applied as a value-added function on top of pre-existing methods. On the other hand, nothing precludes RIS methods from providing the network synchronization reference. Because service to a given wireless device is limited to a local subset of the eNB's in the network, a more optimum rTE alignment amongst the local subset can be applied compared to a global TE alignment. The rTE observations can be used to identify fault conditions in Network Synchronization, or simply to indicate marginal Network Synchronization performance.

Figure 7:
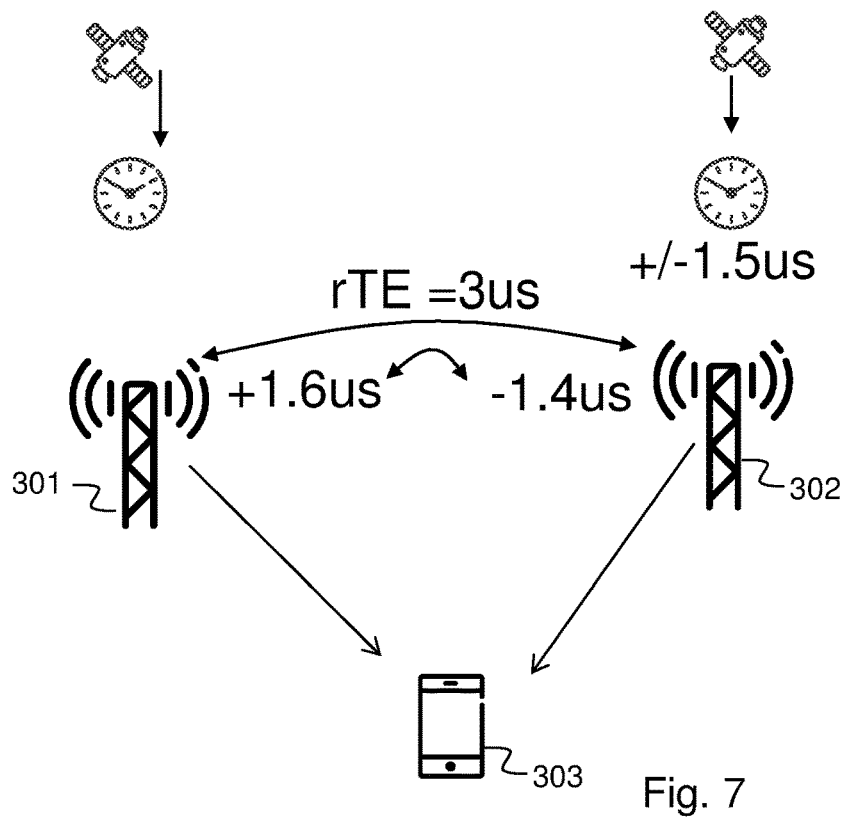
FIG. 7 is a block diagram of a wireless communication network illustrating relative timing errors and deviation from a global time.

For OTDOA and coordinated services it is the rTE between neighbouring base stations involved in the service that matters rather than absolute TE. In many deployments this is also the case for TDD. In fact, generally all 3GPP TE requirements are expressed as rTE, but since relative errors generally are unknown as for absolute errors, a per base station equal and symmetric allocation are often used, like TDD rTE of 3 us to +/−1.5 us to GPS time, which in most cases are not needed and therefore suboptimal. An example for coordinated services is given in FIG. 7. In this example, we assume a relative phase error requirement of 3 us between two base stations for the two base stations to be allowed to deliver a time-sensitive service to a UE 303. When using an absolute error approach, 3 us would be interpreted as the base stations each has to be within +/−1.5 microseconds from the GNSS time. In the example of FIG. 7, a first base station 301 is +1.6 microseconds from GNSS time and a second base station 302 is −1.4 microseconds from GNSS time. Consequently, using the absolute error approach, the first base station 301 would not be accepted for delivering the service to the UE 303. However, the rTE between the first and the second base station 301, 302 is still within the standard requirement of 3 us. With the rTE approach of the present invention on the other hand, the two base stations 301, 302 would be allowed to provide the service to the UE 303.

Figure 8:
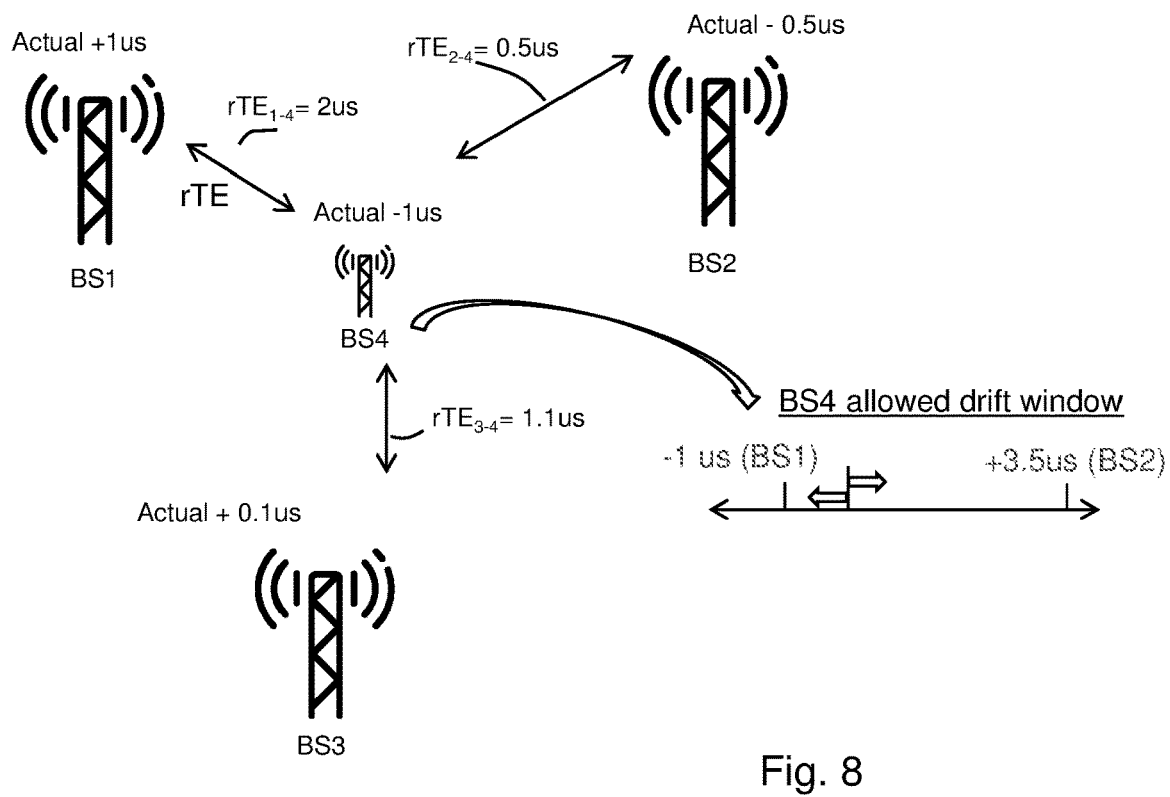
FIG. 8 is another block diagram of another wireless communication network illustrating relative timing errors and deviation from a global time.

Knowing the rTE between neighbour base stations in TDD communications can be used for more optimized synchronization error budget allocation and prolonged holdover durations. FIG. 8 shows an example of benefits with known rTE relations between neighbours in a TDD system. The example of FIG. 8 shows four base stations BS1, BS2, BS3, BS4. In this example, BS4 is relatively isolated in terms of coverage: it has coverage overlap with neighbors BS1, BS2 and BS3 but with no other base stations in the network. The scenario in this example is that the internal clock of BS4 loses its link to an external clock reference such as GPS time. 3GPP spec for TDD is to have rTE less than 3 us between any two neighbor base stations having overlapping coverage. In the example of FIG. 8, at an instant it is determined that rTE between BS1 and BS4, $rTE_{1-4}$, is +2 μs, rTE between BS2 and BS4, $rTE_{2-4}$, is +0.5 μs and rTE between BS3 and BS4, $rTE_{3-4}$, is +1.1 μs. The rTE-values may be determined from inter-BS signaling as discussed above. When looking at BS4, if its internal clock loses its reference, then the internal clock can still drift in a range by −1 us to +3.5 us (shown in FIG. 8 as "BS4 allowed drift window") from the time point of determination and still maintain compliance to the 3GPP spec for TDD amongst its neighbors.

Normally BSs who have a radio frequency relation in TDD would hear each other, and then the rTE could be determined with methods described here. In case it would not be the case, e.g. yet another BS5 (not present in figure) could be present that would hear BS4 but BS4 could not hear BS5, BS4 could not extend beyond its absolute +/−1.5 us limit (during e.g. holdover operation) unless $rTE_{5-4}$ would be known through other relations. Setting up rTE relations would reveal that BS5 can hear BS4 and indicate a potential TDD interference scenario.

For reasons of cost and flexibility, some radio access network nodes rely on generic transport protocols such as Ethernet rather than application specific transport protocols such as Common Public Radio Interface (CPRI), for internal communication between its baseband processing module and its radio antenna point module. This is often referred to as the fronthaul. Generic transport protocols will, in general, have inferior time alignment accuracy compared to CPRI. Hence, rTE observations can be made between radio antenna point modules connected to the same baseband processing module in order to compensate or correct for inferior fronthaul time alignment capability. In effect, making rTE observations will relax the time alignment capabilities of the fronthaul to meet a given intra-node time alignment requirement.

According to an embodiment, in the unlikely event of systematic failure of the common clock (e.g. GNSS) reference, all rTE's in the network may be used to calculate a synthetic common clock reference that would provide a local Network Synchronization reference for all eNB's. Hereby a clock reference can be achieved even in case of a GNSS failure.

Figure 9:
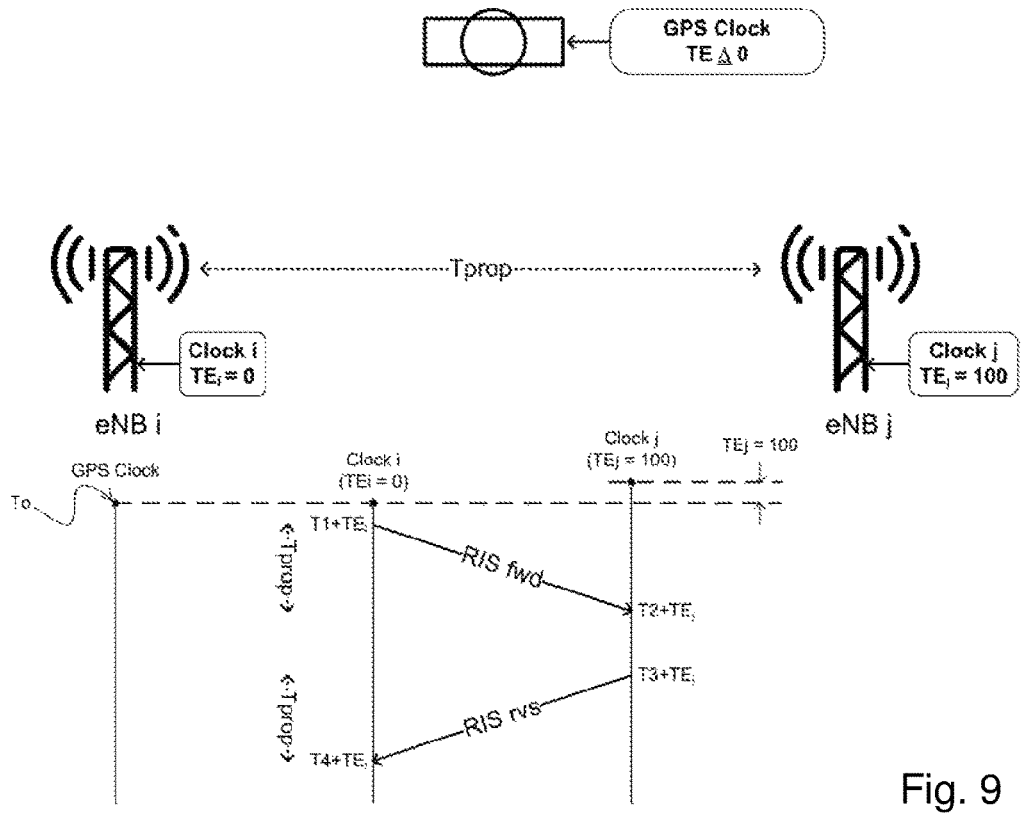
FIG. 9 is a signaling diagram illustrating propagation times and timing errors.

FIG. 9 illustrates an example of how rTE is observed between two eNB's, $eNB_i$ and $eNB_j$. The top part of FIG. 9 represents physical relationships and the bottom part represents the timing relationships of the RIS's as they ingress/egress each eNB. Note that the illustration and subsequent examples in this chapter are simplified for the purposes of explanation. The simplification assumes that rTE results entirely from imperfections in the clocks of each eNB when in fact rTE can occur anywhere in the LTE signal data path. Tprop can, in principle, be measured between any two antenna transmission points, including between two radio units that are connected to the same eNB; or even between two antennas that are connected to the same radio. In the latter cases, there is less scope for rTE since a subset of the eNB functionality affecting rTE is common-mode. However, depending on the rTE magnitude associated with sub-eNB elements and the sensitivity of the end application to rTE, it may be profitable to make observations for transmission-points served by the same eNB.

In the example of FIG. 9, the internal clock of $eNB_i$ has an absolute Time Error (TE) compared to a common reference time base (CRT) of 0 (zero), whereas the internal clock of $eNB_j$ has a TE of 100 time units. Conventionally, a positive TE indicates the clock is advanced relative to the CRT, which may be the GPS System Time. Hence, a given time point in the CRT, T0, coincides with CRT for the clock in eNBi and precedes CRT by 100 units for the clock in eNBj.

The rTE between eNBi and eNBj can be observed by transmitting a RIS from eNBi (labeled RIS,fwd) noting egress time point T1 and ingress time point T2 at eNBj; then transmitting a RIS from eNB_j (labeled RIS,rvs) noting egress time point T3 and ingress time point T4 at eNBi. Any TE_i will corrupt T1 and T4; while TE_j will corrupt T2 and T3. The corrupted time points will result in an asymmetry between the apparent propagation time (Tprop) of the first transmission compared to the second transmission. The true propagation time is assumed equal, due to the principle of reciprocity. Thus, the asymmetry divided by two gives the rTE assuming errors in observing the RIS egress/ingress relative to the eNB clock are negligible. This is a reasonable assumption given the expected RIS transmitter/receiver time-alignment fidelity of eNB implementations which are typically in the order of 10 ns for high performance designs. Factors affecting transmitter/receiver time-alignment fidelity include the capabilities of calibration and compensation algorithms for delay variation in analog components, time-resolution of digitally sampled domains and internal clock distribution.

To the extent that the frequency error between the eNBs is small, which in practice can range from under 0.1 ppb in stable steady-state conditions to 10 ppb, the coordination between the first and second transmissions is not stringent, i.e. they can be asynchronous, in the range of tens of seconds to hundreds of ms. Moreover, the precedence of transmission can be reversed without impact to the resulting rTE observation.

Once the measurements of T1, T2, T3, T4 are collected and the rTE between eNBi and eNBj has been determined, the determined rTE can be taken into consideration in different ways when providing the service to the wireless. A first way, or use case, is to simply determine whether or not a certain time-sensitive service can be applied for a UE, between eNBi and eNBj, and/or what level of performance that can be achieved if eNBi and eNBj are to co-operate in providing the service. As an example, in case of OTDOA it will be possible to determine which precision can be guaranteed in the position of the UE. More sophisticated use cases can be considered, especially when isolated clusters of base stations can be identified.

Figure 10:
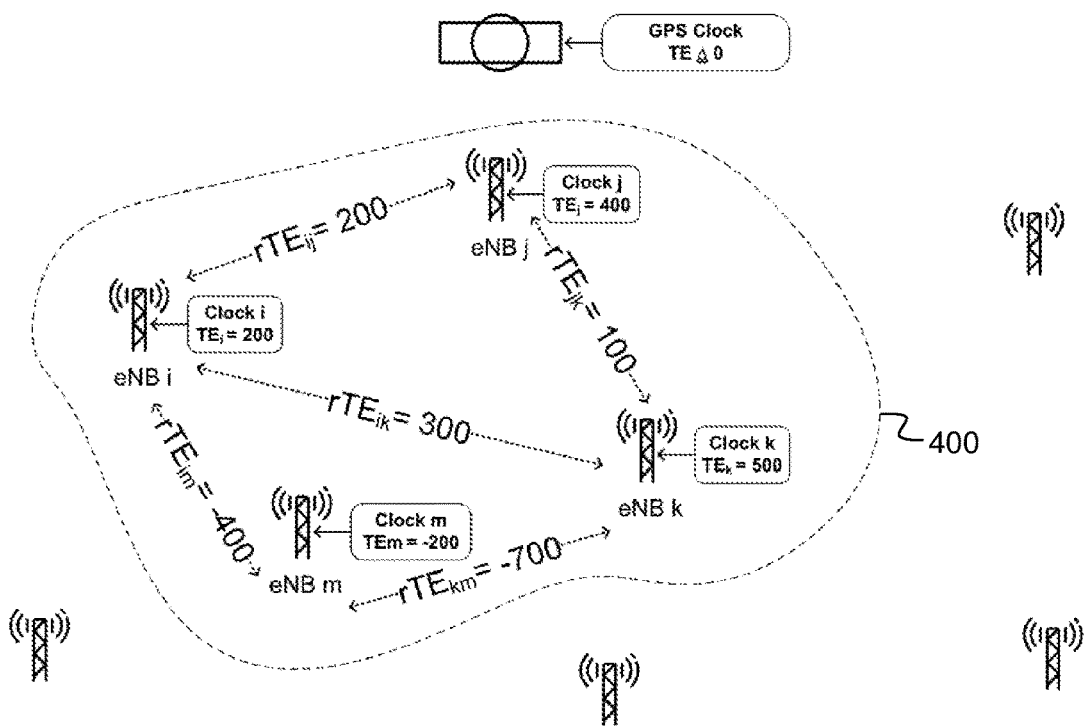
FIG. 10 is a block diagram of a wireless communication network including relative timing errors between base stations of the network.

FIG. 10 illustrates an example Service Entity 400 (enclosed by dashed line) as a subset of eNBs consisting of eNB_i, eNB_j, eNB_k and eNB_m providing a rTE-sensitive service to a UE (not shown). In this example, assuming error-free rTE measurements performed by inter-eNB radio signaling as described above, the observed rTEs between pairs of eNBs of the eNB subset are: rTE_ij=200, rTE_ik=300; rTE_im=−400, rTE_jk=100; rTE_km=−700.

Once the rTEs have been observed, adjustments can be made to time alignment of radio signals that are transmitted, received, or both transmitted and received to the UE by the eNBs in the Service-Entity such that rTE is effectively zeroed. An exemplary method is shown below using the example illustrated in FIG. 10Fel! Hittar inte referenskälla.:
1. select a reference eNB, e.g. eNB_i;
2. determine rTE of all other eNBs in the subset with relation to eNB_i: rTE_ij=200, rTE_ik=300; rTE_im=−400. It is beneficial to observe all feasible rTE, that is also the rTE of the subset not involving rTEi, that is also rTE_jk=100; rTE_km=−700, for two reasons:
   i. rTE with relation to eNB_i that are unavailable/unreliable directly can be obtained as a linear combination of other rTEs, e.g. rTE_ik=rTE_ij+rTE_jk or rTE_ik=rTE_im−rTE_km;
   ii. an integrity check can be evaluated amongst the linear combinations which improves robustness;
3. use an adjustment rule to determine a desired common offset to eNB_i that all eNBs of the subset will be adjusted to.
   a. Rule 1, mid-point between the max{rTE_ix} and min{rTE_ix}, where x [j,k,m].
      i. max{rTE_ix}=300, min{rTE_ix}=−400,
      ii. ΔTE_i=(max{rTE_ix}+min{rTE_ix})/2=−50
   b. Rule 2, select the clock of eNB_i
      i. ΔTE_i=0.
4. Taking the adjustment rule of 3a, apply the adjustment to all eNB's:
   a. Adjust clock_i by ΔTE_i=−50=adjustment_i.
   b. Adjust clock_j by ΔTE_i−rTE_ij=−250=adjustment_j.
   c. Adjust clock_k by ΔTE_i−rTE_ik=−350=adjustment_k.
   d. Adjust clock_m by ΔTE_i−rTE_im=350=adjustment_m.
5. Show the resulting adjusted TE (TEadj):
   a. TEadj_i=TE_i+adjustment_i=200−50=150.
   b. TEadj_j=TE_j+adjustment_j=400−250=150.
   c. TEadj_k=TE_k+adjustment_k=500−350=150
   d. TEadj_m=TE_m+adjustment_m=−200+350=150.

Note that TE and TEadj are generally unknowns and cannot be observed; whereas rTE is known and observable. The selected Adjustment Rule in step 3a above should correspond to the desired system objectives which could include simplicity, robustness, minimize E[TEadj], etc. Moreover, the adjustment magnitude may be constrained in order to avoid interference outside the Service Entity.

Figure 11:
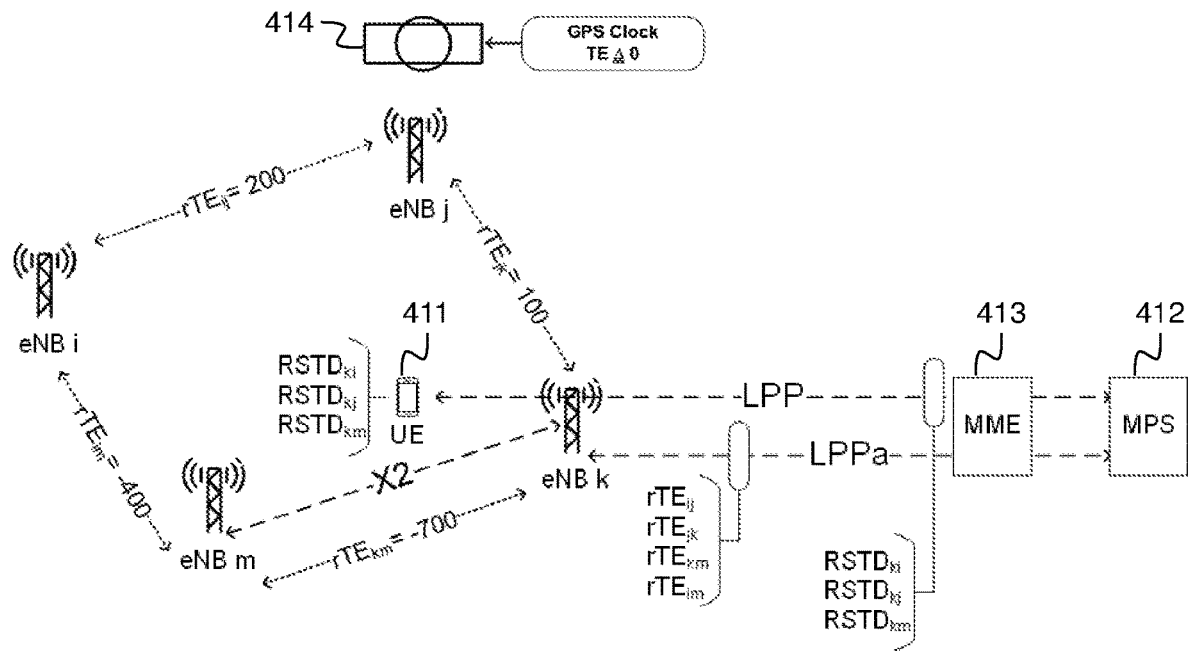
FIG. 11 is a block diagram of a wireless communication network including relative timing errors between base stations of the network, used for a time of arrival positioning service.

In the following, an application of embodiments of the present invention to Time-of-Arrival Positioning Services is being discussed, referring to FIG. 11. As discussed in the background, Time-of-Arrival positioning service such as OTDOA is dependent on precise time alignment between participating cells. OTDOA relies on the UE 411 measuring a positioning reference signal (PRS) time of arrival incident at the UE from a given eNB cell relative to the time of arrival of another PRS sent from a reference eNB cell and assigns the result, to an RSTD-parameter. RSTD measurement is defined in e.g. 3GPP TS 36.214 section 5.1.12. As shown in FIG. 11, and as defined in 3GPP TS 36.355, RSTD is reported via an LTE Positioning Protocol (LPP) to a system or node such as a Mobile Positioning System (MPS) 412 via a Mobility Management Entity (MME) 413, in case of an LTE network or similar. Non-zero rTE between cells will directly result in RSTD error, which in turn will corrupt the positioning solution. RSTD measurements obtained at eNBi, eNBj and eNBm have to be sent to the MPS 412. In FIG. 11, those measurements may be sent to the MPS 412 via $eNB_k$. over an X2-interface. FIG. 11 further comprises a GPS satellite 414 that provides a global clock.

Fortunately, errors introduced to an RSTD because of non-zero rTE can be completely removed at the MPS provided that the rTE between the associated eNB pairs is known. The MPS requests, via for example an LPPa interface, eNB measurements that can directly or indirectly infer rTE between specific eNB pairs. Individual RSTD observations are corrected as follows:

$$RSTD'_{ki}=RSTD_{ki}-rTE_{ki},$$

where $RSTD_{ki}$ is the observed time difference of arrival between reference eNB cell k and other eNB cell i, $rTE_{ki}$ is the relative time error between eNB cell k and eNB cell i, and $RSTD'_{ki}$ is the $RSTD_{ki}$ corrected for $rTE_{ki}$.

The corrected RSTD for eNB_k in relation to eNB_i, eNB_j and eNB_m are explained below:

$$RSTD'_{ki}=RSTD_{ki}-rTE_{ki}=RSTD_{ki}+rTE_{ik}=RSTD_{ki}+(rTE_{ij}+rTE_{jk})$$

$$RSTD'_{kj}=RSTD_{kj}-rTE_{kj}=RSTD_{kj}+rTE_{jk}$$

$$RSTD'_{km}=RSTD_{km}-rTE_{km}.$$

Note that $rTE_{ki}$ can be derived as a combination of other rTE components if it is not available directly. Moreover, confidence data can accompany the rTE's giving the end application guidance to reconcile individual RSTD's that may not align to a single position.

Figure 12:
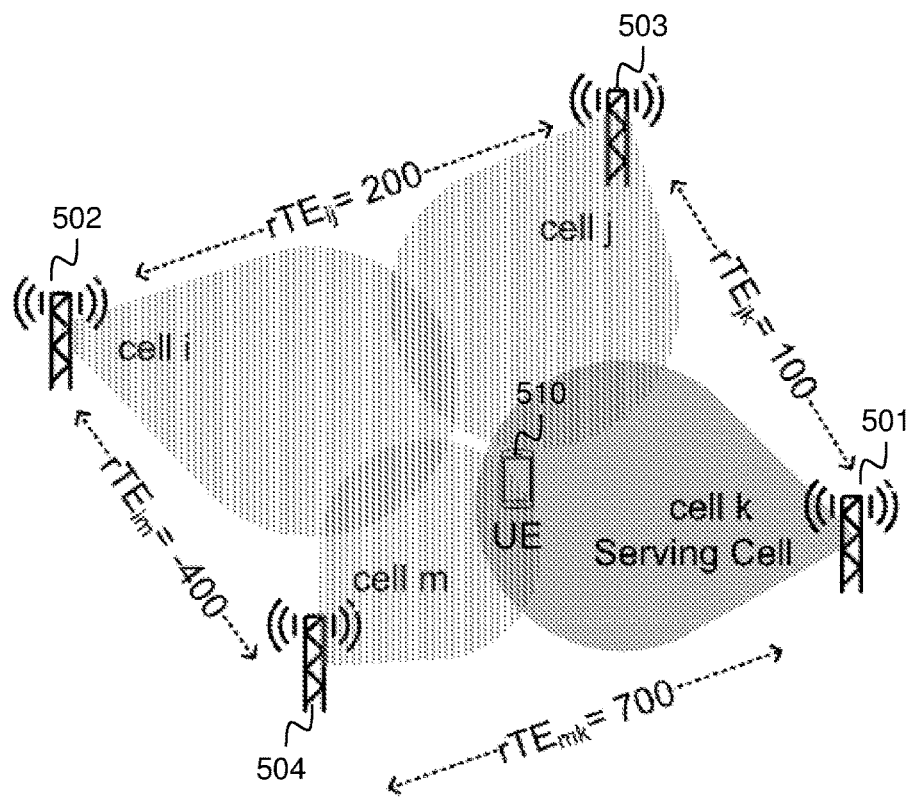
FIG. 12 is a block diagram of a wireless communication network including relative timing errors between base stations of the network, used for a CoMP service, according to an embodiment.

In the following, an application of embodiments of the present invention to a Coordinated Multipoint (CoMP) Service is described, referring to FIG. 12 and FIG. 13. FIG. 12 shows an example in which cell k 501 is a serving cell, and cell i 502, cell j 503 and cell m 504 are candidates for joining a CoMP service. As discussed in the background, CoMP services, such as joint reception and transmission, are dependent on adequate time alignment of signals between participating cells in the CoMP Cooperating Set as they arrive at a cell antenna for joint reception and as they arrive at the UE for joint transmission. The cell antenna captures a complete symbol duration window that must start at or after the maximum delay spread so as not to be corrupted with the end of the prior symbol. Similarly the capture window must end before the end of the transmitted signal. In principle, the cyclic prefix (CP) defines an excess timing budget for the cell antenna capture window which is designed to provide adequate margin to accommodate delay spread amongst multipath for most deployments between one eNB antenna transmission point and the UE such that inter-symbol interference (ISI) is avoided. The incremental burden of CoMP is that since only the serving cell 501 regulates UE frame alignment, directly for the DL and via the TA-command for UL, Tprop for the path of other cells 502, 503, 504 that is different than that of the serving cell 501 consumes part of the CP budget. In addition, any rTE between the serving cell 501 and other cells 502, 503, 504 in the CoMP cooperating set also needs to be absorbed by the CP in order to avoid ISI for signals transmitted to/from the antennas of those cells.

According to an embodiment, it is proposed that rTE observations between cells can be used to favor the UL ISI margin for non-serving cells in a CoMP Cooperating Set (COOP-Set). For example, if cell k 501 is the serving cell for UE 510 and cells j, and m 503, 504 are candidates for a Non-Serving COOP-Set (NS-COOP-Set) of UE 510, $rTE_{jk}$ and $rTE_{mk}$ are determined by sending intercell radio signals between the base stations of the cells k 501 and j 503, and cells k 501 and m 504, respectively. As seen in FIG. 12, $rTE_{jk}=100$ time units (tu) and $rTE_{mk}=700$ tu. Favoring is achieved by means of a bias applied to the timing advance regulation (TA_BIAS) sent to the UE 510 by the serving cell 501 based on knowledge of the rTE with respect to the serving cell of the NS-COOP-Set candidate cells 503, 504, in the above example, $rTE_{jk}$ and $rTE_{mk}$. As there can only be one TA_BIAS, the TA_BIAS at least for the time being has to be derived to jointly benefit all cells selected for the NS-COOP-Set. If both cell j 503 and cell m 504 are to be in the NS-COOP-Set, a possible best TA-BIAS would be (100+700)/2=400, as long as this can maintain adequate margin for the serving cell. If the rate of change for rTE compared to the RRC connection duration is small, in practice this is likely to be true, then the TA_BIAS will not require updates during the UE connection. Otherwise, TA_BIAS could be dynamically updated.

For DL CoMP, rTE can be used to evaluate ISI margin, and hence feasibility, of candidate cells for the NS-COOP-Set. Hence, a subset of candidate cells for the NS-COOP-Set can be identified that are predicted to have adequate DL ISI margin. For some scenarios, operating on the premise that Tprop for the serving cell is statistically likely to be smaller than Tprop for candidate NS-COOP-Set cells, it may be desirable to select candidate cells for the NS-COOP-Set that have positive rTE with respect to the serving cell.

Figure 13:
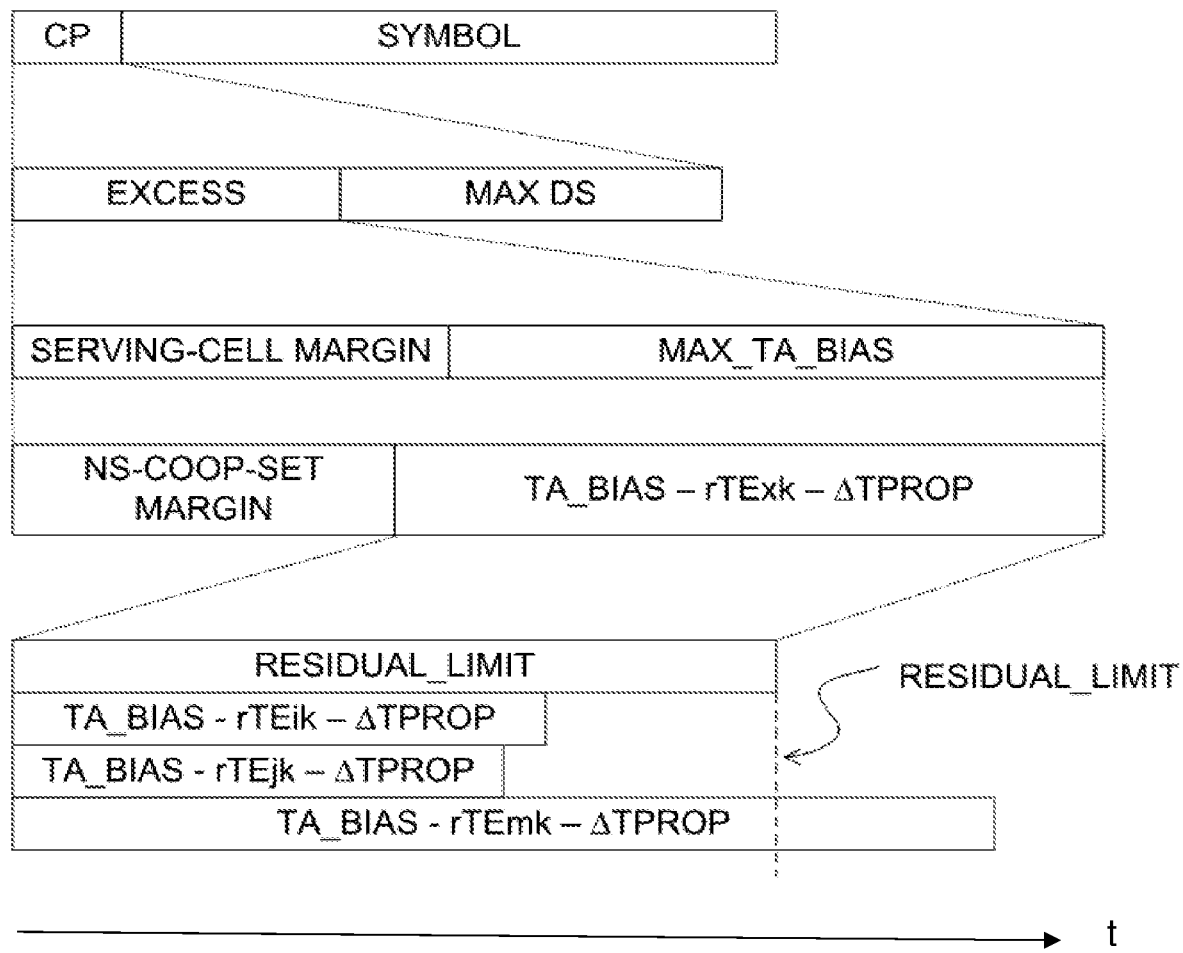
FIG. 13 is a diagram illustrating content of a processing time window of a CoMP transmission, according to an embodiment.

FIG. 13 illustrates an embodiment for determining the TA_BIAS to cater for the rTE. FIG. 13 is a diagram illustrating the processing window=symbol+CP, wherein the CP length is fixed according to 3GPP standards. In particular FIG. 13 shows excess margin of a particular deployment. Components of UL signal time alignment variations needs to be confined within the CP in order to be correctly processed at the base station of the serving-cell. Based on an analysis from previous UE connections of Channel State Information (CSI), UE feedback from eNB transmissions, and analysis of reference signal, such as Sounding Reference Signal (SRS), transmissions, the serving cell may characterize the delay spread within the general coverage area as MAX_DS. Subtracting MAX_DS from the Cyclic Prefix (CP) gives a remainder (EXCESS) that can be partitioned to a safe ISI operating margin for the serving cell, SERVING_CELL_MARGIN. The remaining part of EXCESS defines MAX_TA_BIAS, or the maximum that the Timing Advance (TA) command to the UE may deviate from normal in order to favor the non-serving cells. For the NS-COOP-Set, it is assumed that MAX_DS approximately characterizes delay spread, and hence the same EXCESS applies to them. Similarly, a NS_COOP_SET_MARGIN applies for safe ISI operating margin which likely would be comparable but may be more or less conservative compared to SERVING_CELL_MARGIN. In contrast to the serving-cell, there are two residual quantities: [rTExk] and [deltaTPROP] (in the following called dTPROP) for the NS-COOP-Set cells. [dTPROP] represents the difference in round-trip propagation time needed for a signal to transit between a NS-COOP-Set cell and the UE compared to the round-trip propagation time needed for a signal to transit between the serving cell and the UE. [dTPROP] will usually be positive, since the serving cell is likely to be closer to the UE than the NS-COOP-Set candidates. [dTPROP] can be characterized using the intercell distance (ISD) provisioning guidelines, configured coordinates of the cell transmission points, and inter-cell propagation distance given by the components for rTE:

$$rTE=(TPROP,FWD-TPROP,RVS)/2$$

$$TPROP,TRUE=(TPROP,FWD+TPROP,RVS)/2$$

where TPROP,TRUE is the propagation distance derived from the single direction observations TPROP,FWD and TPROP,RVS.

Using [dTPROP] and [rTExk], a TA_BIAS can be derived that favors the NS-COOP-Set cells subject to a constraint established by MAX_TA_BIAS. Since the rTE are different for every cell, it is likely not possible to select a TA_BIAS that will address all cells perfectly, and hence there will be a residual=[TA_BIAS−rTExk−dTPROP] for each candidate cell. The final step is to assess whether [TA_BIAS−rTExk−dTPROP] for each cell in the NS-COOP-Set fits within the budget designated as a [RESIDUAL_LIMIT]. Outlier cells that do not fit within the [RESIDUAL_LIMIT] should be removed progressively as candidates for the NS-COOP-Set, and a new TA_BIAS should be derived based on that subset.

When determining relative timing errors, measurement errors may occur. If there are no measurement errors, when relative timing errors are measured in a "grid" of base stations, such as in FIG. 10, the sum of relative timing errors along any closed loop in the grid should be zero. However, due to measurement errors, the sum of the relative timing errors in a closed loop will only be approximately zero. In order to select timing values/relative timing errors for the involved base stations/ARPs, least squares methods similar to those used in land surveying can be used, e.g. adjusting the determined time misalignment values such that the sum of the squares of (adjustment divided by an un-reliability value of measurement) is minimized. The un-reliability value could be the standard deviation of the measurement, e.g either $(e/stddev)^2$ or $e^2/variance$.

Figure 14:
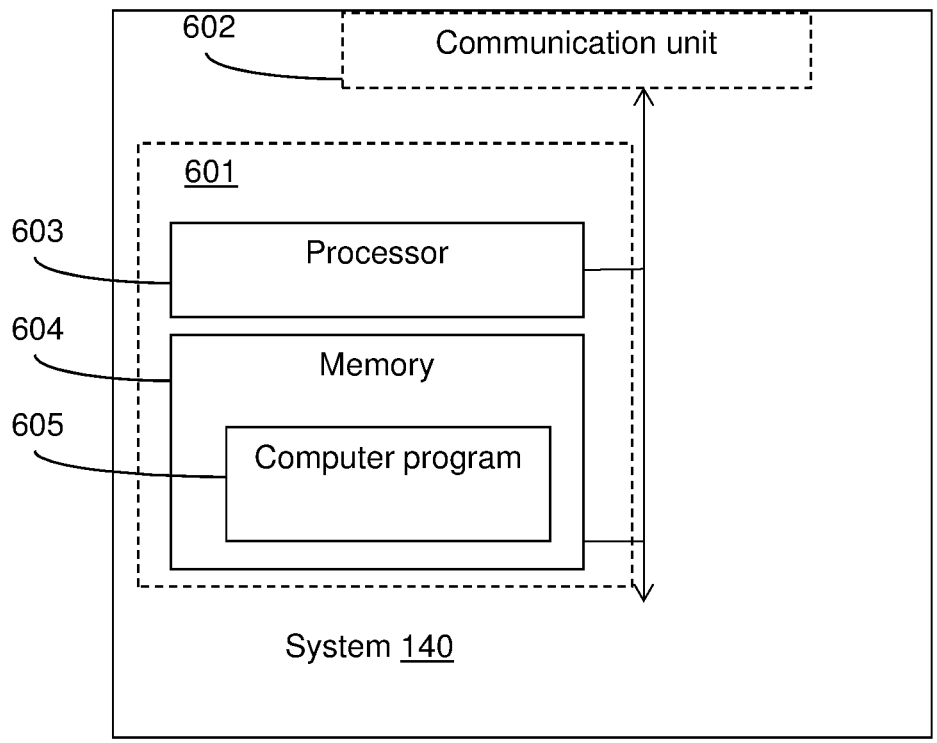
FIGS. 14 and 15 are schematic block diagrams illustrating a system configured for provisioning of a time-sensitive service in more detail, according to further possible embodiments.

FIG. 14, in conjunction with FIG. 3 or 4, describes an embodiment of a system 140 operable in a wireless communication network 100, configured for provisioning of a time-sensitive service related to a wireless device 130. The wireless communication network 100 comprises a plurality of ARPs of one or more radio access network nodes 111, 112 of the wireless communication network. The system 140 comprises processing circuitry 603 and at least one memory 604. The memory 604 contains instructions executable by said processing circuitry, whereby the system 140 is operative for obtaining information that a first ARP 121 and a second ARP 122 of the plurality of ARPs are to provide the time-sensitive service to the wireless device 130, determining, by inter-ARP radio signalling between ARPs of one or more pairs of the plurality of ARPs, one of the one or more pairs including the first ARP 121 and one of the one or more pairs including the second ARP 122, a relative timing error between the first ARP 121 and the second ARP 122, and taking the determined relative timing error into consideration when providing the service to the wireless device 130.

The system 140 may be realized as or in a wireless communication network node, such as a core network node, e.g. a Mobile Positioning System, MPS, node or an access network node. Alternatively, the system 140 may be realized as a group of network nodes, wherein functionality of the system is spread out over different physical, or virtual, nodes of the network. In other words, the system 140 for provisioning of a time-sensitive service related to a wireless device 130 may be a cloud-solution, i.e. the system may be deployed as cloud computing resources that may be distributed in the wireless communication network 100.

According to an embodiment, the system 140 is operative for determining of a relative timing error between the first ARP 121 and the second ARP 122 using inter-ARP radio signaling by
- instructing the radio access network node of the first ARP 121 to send a first radio signal to the second ARP 122 and instructing the radio access network node of the second ARP 122 to send a second radio signal to the first ARP 121 in response to receiving the first radio signal,
- obtaining information of a first time point indicative of transmission of the first radio signal from the first ARP 121;
- obtaining information of a second time point indicative of reception of the first radio signal at the second ARP 122;
- obtaining information of a third time point indicative of transmission of the second radio signal from the second ARP 122;
- obtaining information of a fourth time point indicative of reception of the second radio signal at the first ARP 121, and
- determining the relative timing error between the first ARP 121 and the second ARP 122 based on the first, second, third and fourth time points.

According to another embodiment, the system 140 is operative for taking into consideration only relative timing errors related to ARPs of the plurality of ARPs that are involved in the determining of a relative timing error between the first ARP 121 and the second ARP 122, when providing the service to the wireless device 130.

According to another embodiment, the system 140 is operative for taking the determined relative timing error into consideration by adjusting a time point for transmission of data of the time sensitive-service from the first ARP 121 to the wireless device 130 to a time point for transmission of data of the time-sensitive service from the second ARP 122 to the wireless device 130 based on the determined relative timing error in order to synchronize the transmission of data of the time-sensitive service from the first ARP 121 to the transmission of data of the time-sensitive service from the second ARP 122.

According to another embodiment, the system 140 is operative for taking the determined relative timing error into consideration by determining whether the relative timing error is below a defined threshold for providing the time-sensitive service.

According to another embodiment, the determined relative timing error comprises a quality estimate estimating the accuracy of the relative timing error.

According to another embodiment, the determined relative timing error comprises information of historical drift of the relative timing error and information of when the relative timing error was determined.

According to another embodiment, the time-sensitive service is a Time-of-Arrival positioning service such as Observed Time Difference of Arrival, OTDOA. Further, the system 140 is operative for obtaining an observed time difference of arrival at the wireless device 130, of a first positioning signal at the wireless device from the first ARP 121 and of a second positioning signal at the wireless device from the second ARP 122. The system is further operative for taking the determined relative timing error into consideration when providing the service to the wireless device by adapting the obtained observed time difference of arrival with the determined relative timing error.

According to another embodiment the time-sensitive service is a CoMP service, wherein the first ARP 121 is a serving cell and the second ARP 122 is a candidate cell. The system is further operative for obtaining a timing advance (TA) value for the wireless device 130 determining when the wireless device 130 is to transmit a CoMP signal to the first and the second ARP 122, the TA value being obtained so that the CoMP signal is received within a time window of the first ARP 121 and within a time window of the second ARP 122. The system 140 is further operative for taking the determined relative timing error into consideration when providing the service to the wireless device 130 by adapting the obtained TA value with the determined relative timing error, and initiating transmission of the adapted TA value to the wireless device 130.

According to another embodiment, the system 140 is further operative for obtaining information that the first ARP 121 and a third ARP 123 of the plurality of ARPs are to provide the time-sensitive service to a second wireless device, determining, by inter-ARP radio signalling between ARPs of one or more pairs of the plurality of ARPs, one of the one or more pairs including the first ARP 121 and one of the one or more pairs including the third ARP 123, a second relative timing error between the first ARP 121 and the third ARP 123, and taking the determined second relative timing error into consideration when providing the service to the second wireless device.

According to other embodiments, the system 140 may further comprise a communication unit 602, which may be considered to comprise conventional means for communication with radio access nodes, such as nodes 111 and 112, and in case the system 140 is realized as a radio access node, the communication unit 602 comprises conventional means for wireless communication with the wireless device 130, such as a transceiver for wireless transmission and reception. The communication unit 602 may also comprise conventional means for communication with other network nodes of the wireless communication network 100. The instructions executable by said processing circuitry 603 may be arranged as one or more computer programs 605 stored e.g. in said one or more memories 604. The processing circuitry 603 and the one or more memories 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program(s) 605 may be arranged such that when its instructions are run in the processing circuitry, they cause the system 140 to perform the steps described in any of the described embodiments of the system 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 140 has access via the communication unit 602. The computer program 605 may then be downloaded from the server into the memory 604.

Figure 15:
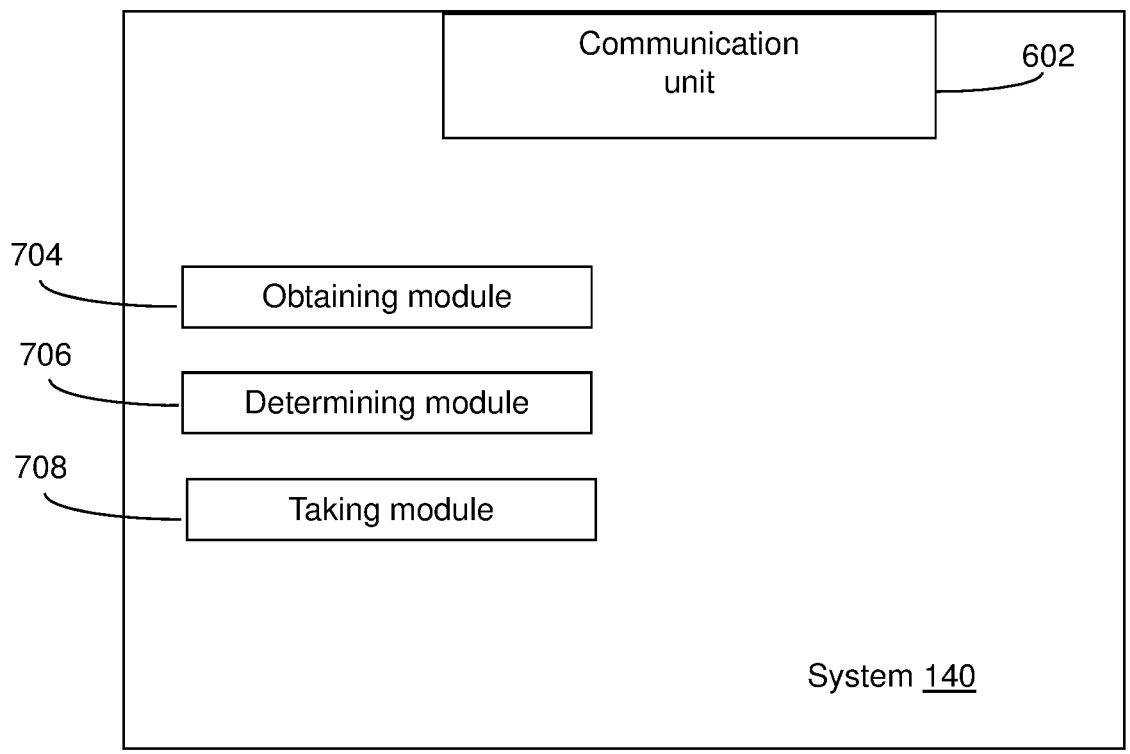

FIG. 15, in conjunction with FIG. 3 or 4, another embodiment of a system 140 operable in a wireless communication network 100, configured for provisioning of a time-sensitive service related to a wireless device 130. The wireless communication network 100 comprises a plurality of ARPs of one or more radio access network nodes 111, 112 of the wireless communication network. The system 140 comprises an obtaining module 704 for obtaining information that a first ARP 121 and a second ARP 122 of the plurality of ARPs are to provide the time-sensitive service to the wireless device 130. The system 140 further comprises a determining module 706 for determining, by inter-ARP radio signaling between ARPs of one or more pairs of the plurality of ARPs, one of the one or more pairs including the first ARP 121 and one of the one or more pairs including the second ARP 122, a relative timing error between the first ARP 121 and the second ARP 122. The system 140 further comprises a taking module 708 for taking the determined relative timing error into consideration when providing the service to the wireless device 130. The system 140 may further comprise a communication unit 602 similar to the communication unit described in FIG. 14. In an embodiment, the modules of FIG. 15 are implemented as a computer program running on a processing circuitry, such as the processing circuitry 603 shown in FIG. 14.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system of a wireless communication network related to provisioning of a time-sensitive service related to a wireless device, the wireless communication network comprising a plurality of antenna reference points, ARPs, of one or more radio access network nodes of the wireless communication network, the method comprising:
   obtaining information that a first ARP and a second ARP of the plurality of ARPs are to provide the time-sensitive service to the wireless device;
   determining, by inter-ARP radio signalling between ARPs of one or more pairs of the plurality of ARPs, one of the one or more pairs including the first ARP and one of the one or more pairs including the second ARP, a relative timing error between the first ARP and the second ARP, and
   taking the determined relative timing error into consideration when providing the service to the wireless device,
   wherein the time-sensitive service is a Coordinated Multipoint service (CoMP), and wherein the first ARP is a serving cell and the second ARP is a candidate cell, and wherein the method further comprises:
   obtaining a timing advance (TA) value for the wireless device determining when the wireless device is to transmit a CoMP signal to the first and the second ARP, the TA value being obtained so that the CoMP signal is received within a time window of the first ARP and within a time window of the second ARP,
   and wherein the taking of the determined relative timing error into consideration when providing the service to the wireless device comprises adapting the obtained TA value with the determined relative timing error, and the method further comprises:
   initiating transmission of the adapted TA value to the wireless device.

2. The method according to claim 1, wherein the determining the relative timing error between the first ARP and the second ARP using inter-ARP radio signalling further comprises:
   instructing the radio access network node of the first ARP to send a first radio signal to the second ARP and instructing the radio access network node of the second ARP to send a second radio signal to the first ARP in response to receiving the first radio signal;
   obtaining information of a first time point indicative of transmission of the first radio signal from the first ARP;
   obtaining information of a second time point indicative of reception of the first radio signal at the second ARP;
   obtaining information of a third time point indicative of transmission of the second radio signal from the second ARP;
   obtaining information of a fourth time point indicative of reception of the second radio signal at the first ARP, and
   determining the relative timing error between the first ARP and the second ARP based on the first, second, third and fourth time points.

3. The method according to claim 1, wherein relative timing errors related to ARPs of the plurality of ARPs that are not involved in determining the relative timing error between the first ARP and the second ARP are not taken into consideration when providing the service to the wireless device.

4. The method according to claim 1, wherein the determined relative timing error is taken into consideration by adjusting a time point for transmission of data of the time sensitive-service from the first ARP to the wireless device to a time point for transmission of data of the time-sensitive service from the second ARP to the wireless device based on the determined relative timing error in order to synchronize the transmission of data of the time-sensitive service from the first ARP to the transmission of data of the time-sensitive service from the second ARP.

5. The method according to claim 1, wherein the determined relative timing error is taken into consideration by determining whether the relative timing error is below a defined threshold for providing the time-sensitive service.

6. The method according to claim 1, wherein the determined relative timing error comprises a quality estimate estimating the accuracy of the relative timing error.

7. The method according to claim 1, wherein the determined relative timing error comprises information of historical drift of the relative timing error and information of when the relative timing error was determined.

8. The method according to claim 1, wherein the time-sensitive service is a Time-of-Arrival positioning service such as Observed Time Difference of Arrival, OTDOA, and wherein the method further comprises:
obtaining an observed time difference of arrival at the wireless device, of a first positioning signal at the wireless device from the first ARP and of a second positioning signal at the wireless device from the second ARP, and
wherein the taking of the determined relative timing error into consideration when providing the service to the wireless device comprises adapting the obtained observed time difference of arrival with the determined relative timing error.

9. The method according to claim 1, further comprising:
obtaining information that the first ARP and a third ARP of the plurality of ARPs are to provide the time-sensitive service to a second wireless device,
determining, by inter-ARP radio signalling between ARPs of one or more pairs of the plurality of ARPs, one of the one or more pairs including the first ARP and one of the one or more pairs including the third ARP, a second relative timing error between the first ARP and the third ARP, and
taking the determined second relative timing error into consideration when providing the service to the second wireless device.

10. A system operable in a wireless communication network, configured for provisioning of a time-sensitive service related to a wireless device, the wireless communication network comprising a plurality of antenna reference points, ARPs, of one or more radio access network nodes of the wireless communication network, the system comprising a processing circuitry and a memory, said memory containing instructions executable by said processing circuitry, whereby the system is operative for:
obtaining information that a first ARP and a second ARP of the plurality of ARPs are to provide the time-sensitive service to the wireless device;
determining, by inter-ARP radio signalling between ARPs of one or more pairs of the plurality of ARPs, one of the one or more pairs including the first ARP and one of the one or more pairs including the second ARP, a relative timing error between the first ARP and the second ARP, and
taking the determined relative timing error into consideration when providing the service to the wireless device,
wherein the time-sensitive service is a Coordinated Multipoint service (CoMP), and wherein the first ARP is a serving cell and the second ARP is a candidate cell, and wherein the system is further operative for:
obtaining a timing advance (TA) value for the wireless device determining when the wireless device is to transmit a CoMP signal to the first and the second ARP, the TA value being obtained so that the CoMP signal is received within a time window of the first ARP and within a time window of the second ARP, and wherein the system is operative for taking the determined relative timing error into consideration when providing the service to the wireless device by adapting the obtained TA value with the determined relative timing error, and the system is further operative for:
initiating transmission of the adapted TA value to the wireless device.

11. The system according to claim 10, wherein the system being operative for determining of the relative timing error between the first ARP and the second ARP using inter-ARP radio signalling comprises the system being further operative for:
instructing the radio access network node of the first ARP to send a first radio signal to the second ARP and instructing the radio access network node of the second ARP to send a second radio signal to the first ARP in response to receiving the first radio signal;
obtaining information of a first time point indicative of transmission of the first radio signal from the first ARP;
obtaining information of a second time point indicative of reception of the first radio signal at the second ARP;
obtaining information of a third time point indicative of transmission of the second radio signal from the second ARP;
obtaining information of a fourth time point indicative of reception of the second radio signal at the first ARP, and
determining the relative timing error between the first ARP and the second ARP based on the first, second, third and fourth time points.

12. The system according to claim 10, wherein relative timing errors related to ARPs of the plurality of ARPs that are not involved in the determining of a relative timing error between the first ARP and the second ARP are not taken into consideration when providing the service to the wireless device.

13. The system according to claim 10, operative for taking the determined relative timing error into consideration by adjusting a time point for transmission of data of the time sensitive-service from the first ARP to the wireless device to a time point for transmission of data of the time-sensitive service from the second ARP to the wireless device based on the determined relative timing error in order to synchronize the transmission of data of the time-sensitive service from the first ARP to the transmission of data of the time-sensitive service from the second ARP.

14. The system according to claim 10, operative for taking the determined relative timing error into consideration by determining whether the relative timing error is below a defined threshold for providing the time-sensitive service.

15. The system according to claim 10, wherein the determined relative timing error comprises a quality estimate estimating the accuracy of the relative timing error.

16. The system according to claim 10, wherein the determined relative timing error comprises information of historical drift of the relative timing error and information of when the relative timing error was determined.

17. The system according to claim 10, wherein the time-sensitive service is a Time-of-Arrival positioning service such as Observed Time Difference of Arrival, OTDOA, and wherein the system is further operative for:
obtaining an observed time difference of arrival at the wireless device, of a first positioning signal at the wireless device from the first ARP and of a second positioning signal at the wireless device from the second ARP, and wherein the system is operative for taking the determined relative timing error into consideration when providing the service to the wireless device by adapting the obtained observed time difference of arrival with the determined relative timing error.

18. The system according to claim 10, further being operative for:

obtaining information that the first ARP and a third ARP of the plurality of ARPs are to provide the time-sensitive service to a second wireless device, determining, by inter-ARP radio signalling between ARPs of one or more pairs of the plurality of ARPs, one of the one or more pairs including the first ARP and one of the one or more pairs including the third ARP, a second relative timing error between the first ARP and the third ARP, and taking the determined second relative timing error into consideration when providing the service to the second wireless device.

19. A non-transitory computer readable medium comprising instructions, which, when executed by at least one processing circuitry of a system of a wireless communication network, configured for provisioning of a time-sensitive service related to a wireless device, the wireless communication network comprising a plurality of antenna reference points, ARPs, of one or more radio access network nodes of the wireless communication network, causes the system to perform the following steps:

obtaining information that a first ARP and a second ARP of the plurality of ARPs are to provide the time-sensitive service to the wireless device;

determining, by inter-ARP radio signalling between ARPs of one or more pairs of the plurality of ARPs, one of the one or more pairs including the first ARP and one of the one or more pairs including the second ARP, a relative timing error between the first ARP and the second ARP, and taking the determined relative timing error into consideration when providing the service to the wireless device, wherein the time-sensitive service is a Coordinated Multipoint service (CoMP), and wherein the first ARP is a serving cell and the second ARP is a candidate cell, and wherein the system is further operative for:

obtaining a timing advance (TA) value for the wireless device determining when the wireless device is to transmit a CoMP signal to the first and the second ARP, the TA value being obtained so that the CoMP signal is received within a time window of the first ARP and within a time window of the second ARP, and wherein the system is operative for taking the determined relative timing error into consideration when providing the service to the wireless device by adapting the obtained TA value with the determined relative timing error, and the system is further operative for:

initiating transmission of the adapted TA value to the wireless device.

* * * * *